United States Patent Office 3,106,438
Patented Oct. 8, 1963

3,106,438
BROMINATED 1-HYDROXY-4-ANILINOANTHRA-QUINONE DYE COMPOUNDS
George F. Converse, Robert W. Kennedy, and William J. Clegg, Kingsport, Tenn., assignors to Eastman Kodak Company, Rochester, N.Y., a corporation of New Jersey
No Drawing. Filed Dec. 24, 1959, Ser. No. 861,751
4 Claims. (Cl. 8—39)

This invention relates to new anthraquinone compounds, to a process for their preparation and their application to the art of dyeing or coloring.

We have discovered that the new anthraquinone compounds having the general formula:

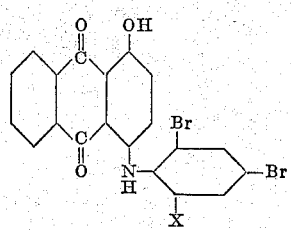

wherein X represents a bromine atom or a chlorine atom, are valuable dyes for linear aromatic polyester fibers such as polyethylene terephthalate fibers, for example. They dye the aforesaid polyester fibers red shades which have excellent fastness, for example, to light, washing and sublimation.

We are aware that 1-hydroxy-4-anilinoanthraquinone is known. This compound dyes polyester fibers, such as Dacron and Kodel, bluish-violet shades whereas the dye compounds of the present invention dye polyester fibers, such as Dacron and Kodel, bluish-red shades having better fastness to light, washing and sublimation. To illustrate, 1-hydroxy - 4 - (2′,4′,6′-tribromoanilino)anthraquinone yields bluish-red dyeings on polyester fabrics which have better fastness to washing and sublimation than the dyeings obtained on polyester fabrics with 1-hydroxy-4-anilinoanthraquinone. Further, the light fastness is increased from 20 Fade-Ometer hours to 40–80 Fade-Ometer hours.

1-hydroxy-4 - (2′,4′,6′-tribromoanilino)anthraquinone, our preferred compound, is prepared by brominating 1-hydroxy-4-anilinoanthraquinone or 1-hydroxy - 4-(o-bromoanilino)anthraquinone. 1-hydroxy-4-(2′-chloro - 4′,6′-dibromoanilino)anthraquinone is prepared by brominating 1-hydroxy - 4 - (o-chloroanilino)anthraquinone. The bromination reaction is carried out with bromine in the presence of an inert solvent. In carrying out the bromination reaction the starting anthraquinone compound is first dissolved in the inert solvent and then the bromine is gradually added. The manner in which the process of the invention is carried out is fully described in the examples given hereafter.

Inert solvents that can be used include, for example, sulfuric acid, trichlorobenzene and nitrobenzene. The use of sulfuric acid and in a concentration of about 88% to about 93% is preferred. The use of sulfuric acid greater than 93% tends to cause some sulfonation which manifests itself as a water-soluble violet dye. When sulfuric acid is used as the inert solvent it is not necessary to use the full amount of bromine calculated from theoretical considerations in order to obtain the desired amount of bromination. This is because hydrogen bromide, a by-product, is oxidized by sulfuric acid to free bromine.

Over-bromination or under-bromination results in dyestuffs that give bluer dyeings. That is, if the bromination is not carried out until 1-hydroxy-4-(2′,4′,6′-tribromoanilino)anthraquinone or 1-hydroxy-4-(2′-chloro-4′,6′-dibromoanilino)anthraquinone is obtained, bluer dyestuffs are obtained. Similarly, if bromination is carried on past the formation of the compounds of the invention bluer dyestuffs start to be formed.

We prefer to brominate 1-hydroxy - 4 - anilinoanthraquinone in sulfuric acid using just sufficient bromine to obtain 1-hydroxy-4 - (2′,4′,6′-tribromoanilino)anthraquinone. If desired, bluer shades of red can be obtained by either under- or over-bromination.

The bromination reaction can be carried out with a bromination catalyst such as iodine, ferrous sulfate, iron or sulfur, for example, being present. One or more catalysts can be present. However, when nitrobenzene or trichlorobenzene is the inert solvent employed no catalyst is necessary.

The following examples illustrate the anthraquinone compounds of the invention and the manner in which they are prepared.

Example I 31.5 g. of 1-hydroxy-4-anilinoanthraquinone were added with stirring to 600 g. of 93% sulfuric acid. The mixture resulting was heated to 60° C. to dissolve the 1-hydroxy-4-anilinoanthraquinone and then cooled to 35° C. 0.5 g. of iodine crystals were added and then 50 g. of bromine were added with stirring over a two-hour period at 35–40° C. The reaction mixture was heated slowly to 60° C. and held at this temperature for two hours. It was then heated to 100° C. and held at this temperature for one-half hour after which it was cooled to 40° C. and poured into 2,000 cc. of cold water. Sodium sulfite was added to remove any excess bromine. The reaction mixture was then heated to 90–95° C. with live steam to coagulate the fine precipitate. The reaction mixture was then filtered and the 1-hydroxy-4-(2′,4′,6′-tribromoanilino)anthraquinone recovered on the filter was washed with water until it was acid free. The reaction product is a dark red solid which assays about 42–43% bromine.

Example II 5 g. of 1-hydroxy-4-anilinoanthaquinone are added to 100 cc. of nitrobenzene. The mixture resulting was heated to 120° C. to dissolve the 1-hydroxy-4-anilinoanthraquinone and then cooled to 50° C. 8 g. of bromine were added dropwise while maintaining a reaction temperature of 50–60° C. After the addition of the bromine the reaction mixture was heated to 70° C. and held at this temperature for one hour after which it was raised to 120° C. and held at this temperature for two hours. The reaction product 1 - hydroxy - 4 - (2′,4′,6′-tribromoanilino)anthraquinone was obtained by steam distillation of the solvent.

Example III 11 g. of 1-hydroxy-4-(o-chloroanilino)anthraquinone were added to 100 cc. of nitrobenzene. The mixture resulting was then heated to 120° C. to dissolve the 1-hydroxy - 4 - (o - chloroanilino)anthraquinone and then cooled to 50° C. 16 g. of bromine were then added dropwise while maintaining the reaction temperature at 50–60° C. The reaction mixture was then heated to 70° C., held at this temperature for one hour, then raised to 120° C. and held at this temperature for two hours. The reaction product 1-hydroxy-4-(2′-chloro-4′,6′-dibromoanilino)anthraquinone was obtained by steam distillation of the solvent.

Example IV 14.2 g. of 1-hydroxy-4-anilinoanthraquinone were added to 150 cc. of 1,2,4-trichlorobenzene. The resulting mixture was heated to 210° C. to dissolve the 1-hydroxy-4-anilinoanthraquinone and then cooled to 60° C. 21.6 g. of bromine were added to the reaction mixture over a two-hour period while maintaining the reaction temperature at 50–60° C. The reaction mixture was then heated to 120° C. and held at 110–120° C. for four hours after which it was allowed to cool and stand overnight. 4 g. of bromine were added at 35° C. and then the reaction mixture was heated to 100° C. and held at this temperature for three hours and then at 150° C. for one hour. The reaction product 1-hydroxy-4-(2',4',6'-tribromoanilino)anthraquinone was obtained by steam distillation of the solvent.

The 1-hydroxy-4-(o-chloroanilino)anthraquinone used in Example III was prepared as follows:

*Example V*

400 cc. of 95% ethyl alcohol and 60 g. of anhydrous boric acid were heated together to reflux, with stirring, to dissolve the boric acid. 32 g. of leucoquinizarin, 75 g. of quinizarin and 64 g. of o-chloroaniline were added to the reaction mixture. The reaction mixture was then refluxed, with stirring, for 20–40 hours and then cooled. 200 cc. of ethyl alcohol were added, the reaction mixture was filtered and the product collected on the filter was washed with ethyl alcohol. The dark violet powder thus obtained was reslurried in 1% aqueous sodium hydroxide, filtered and the product collected on the filter was washed alkali free with water to remove any unreacted quinizarin and dried. The product obtained was essentially 1-hydroxy-4-(o-chloroanilino)anthraquinone.

The anthraquinone compounds of the invention can be applied to polyester fibers by known methods for dyeing polyester fibers. They can be applied as follows:

1 part (by weight) of dye, previously dispersed by milling an aqueous paste of the dye with a lignin sulfonate, such as sodium lignin sulfonate, is added to 3000 parts of water containing 15 parts of emulsified orthophenylphenol, trichlorobenzene or other carrier useful for dyeing polyester fibers. 100 parts of a polyester fabric, made of Dacron or Kodel polyester fiber, for example, are entered into the dyebath at 60° C. and the temperature of the dyebath is raised to the boil in 20 minutes. The fabric is dyed for 1 hour at near the boil, then is removed from the bath, rinsed with water, and any residual carrier is removed by heating the fabric to about 350° C.

The dye compounds of Examples 1 to 4 were applied to polyester fabrics using the dyeing procedure just described. In each instance the fabric was dyed a bright bluish-red shade having excellent fastness to light, washing and sublimation.

The invention has been described in detail with particular reference to preferred embodiments thereof, but it will be understood that variations and modifications can be effected within the spirit and scope of the invention as described hereinabove and as defined in the appended claims.

We claim:

1. Linear aromatic polyester fibers dyed with an anthraquinone compound having the formula:

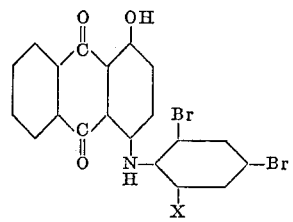

wherein X represents a member selected from the group consisting of a bromine atom and a chlorine atom.

2. Polyethylene terephthalate fibers dyed with the anthraquinone compounds set forth in claim 1.

3. Linear aromatic polyester fibers dyed with 1-hydroxy-4-(2',4',6'-tribromoanilino)anthraquinone.

4. Linear aromatic polyester fibers dyed with 1-hydroxy-4-(2'-chloro-4',6'-dibromoanilino)anthraquinone.

References Cited in the file of this patent

UNITED STATES PATENTS

| | | |
|---|---|---|
| 2,236,672 | Coffey et al. | Apr. 1, 1941 |
| 2,419,405 | Klein | Apr. 22, 1947 |
| 2,585,681 | Randall et al. | Feb. 12, 1952 |
| 2,823,212 | Anton et al. | Feb. 11, 1958 |
| 2,899,438 | Jenny | Aug. 11, 1959 |
| 2,918,344 | Jenny | Dec. 22, 1959 |
| 2,944,870 | Atkinson et al. | July 12, 1960 |
| 2,990,413 | Gehrke | June 27, 1961 |
| 2,993,917 | Weinstein et al. | July 25, 1961 |

FOREIGN PATENTS

| | | |
|---|---|---|
| 248,874 | Great Britain | Mar. 18, 1926 |